E. G. TODT.
METAL CUTTING MACHINE.
APPLICATION FILED JULY 26, 1909.
958,197.
Patented May 17, 1910.
2 SHEETS—SHEET 1.
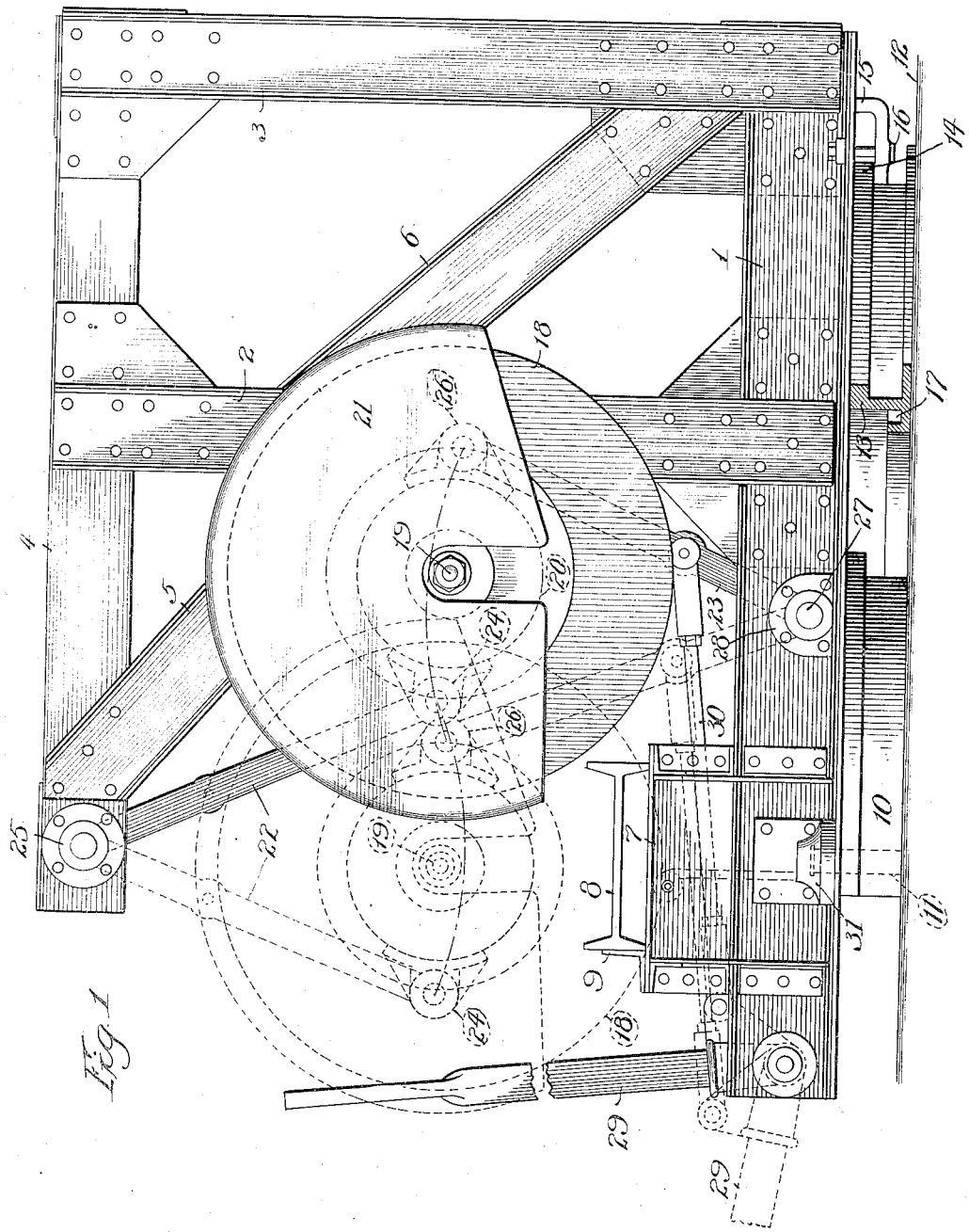
WITNESSES
INVENTOR

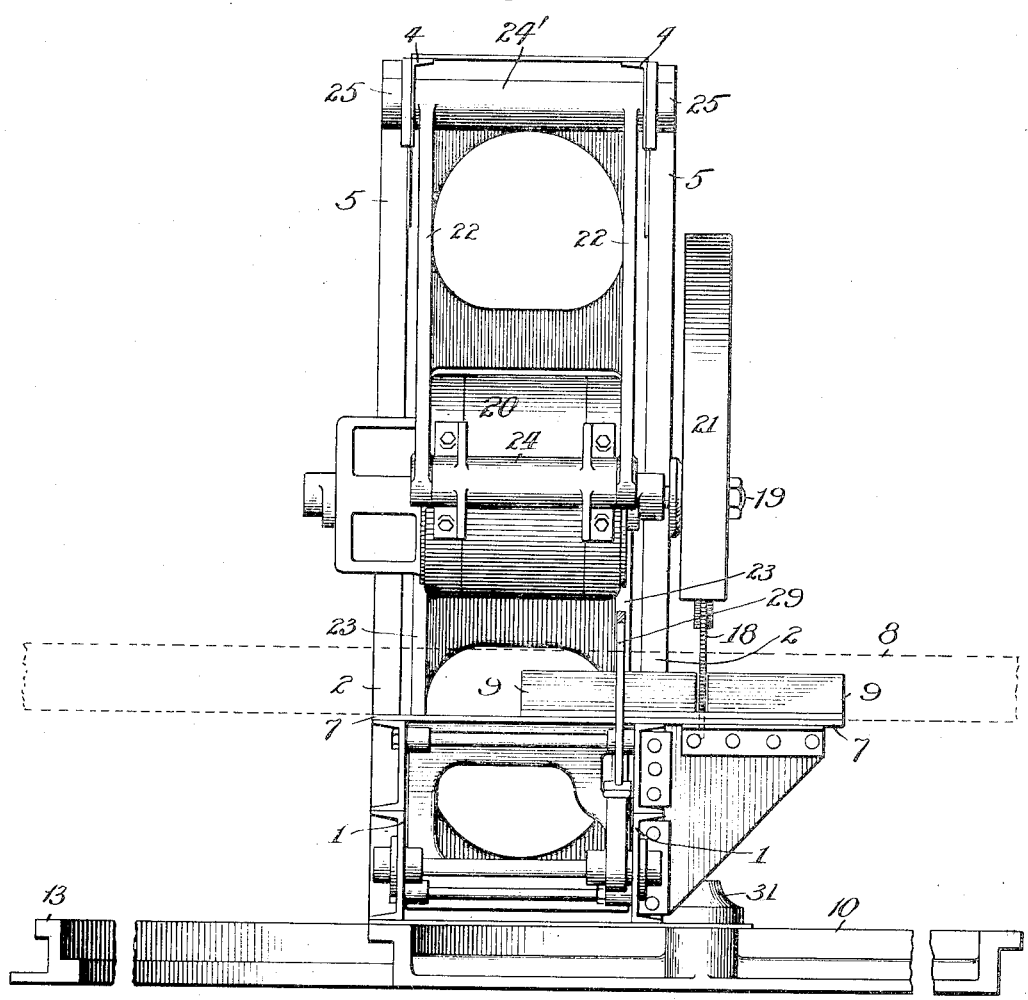

UNITED STATES PATENT OFFICE.

EDWARD G. TODT, OF MANITOWOC, WISCONSIN.

METAL-CUTTING MACHINE.

958,197.  Specification of Letters Patent.  Patented May 17, 1910.

Original application filed February 8, 1909, Serial No. 476,830. Divided and this application filed July 26, 1909. Serial No. 509,500.

*To all whom it may concern:*

Be it known that I, EDWARD G. TODT, a citizen of the United States, residing at Manitowoc, in the county of Manitowoc and State of Wisconsin, have invented certain new and useful Improvements in Metal-Cutting Machines, of which the following is a specification.

The invention relates to metal cutting machines, and has for its primary objects: the provision of an improved and simplified mounting for the saw whereby it may be readily moved to and from the member to be cut; the provision of a swinging link mounting of the character specified in which the movement of the axis of the saw is maintained in a right line; and the provision of a shiftable machine of the character indicated which has all of the stability of alinement of a permanently fixed machine. One embodiment of the invention is illustrated in the accompanying drawings, wherein:—

Figure 1 is a side elevation of the machine, and

Figure 2 is a front elevation thereof.

The purpose or function of the particular embodiment of the invention illustrated in the drawings, is the severing of commercial sections, such as I beams and the like, but it will be obvious that the invention is capable of wide application, and it is not limited to this particular case. The machine as hereinafter described in detail, comprises a frame for supporting the member or section to be cut, and a saw, with its drive motor mounted for free movement toward and from the member, the latter function being desirable as it avoids the necessity of moving the long unwieldly commercial sections or members to suit the position of the saw. The machine thus arranged has all the stability of a permanent machine combined with the adaptability of a movable saw.

The main framework comprises the pair of horizontal channel beams 1—1; the two pairs of vertical channel beams 2—2 and 3—3; the upper pair of horizontal channel beams 4—4 and the two pairs of bracing struts 5—5 and 6—6, all securely fastened together by means of rivets and gusset plates as shown. The front portion of the frame is provided with the work supporting table 7 of the construction clearly indicated in Figures 1 and 2, which table is adapted to support the I beam 8 or other section to be severed, and carries upon its upper surface the positioning angle bar 9.

The saw preferably employed consists of a smooth steel sheet 18 secured to the end of the shaft 19, which shaft constitutes the axis of the electric motor 20, and carries the armatures thereof. The saw is provided with the usual metal shield 21.

The means whereby the motor and saw are mounted for free lateral movement in substantially a right line constitutes the principal feature of my present invention, other features of the machine here illustrated being more fully shown, described and claimed in my co-pending application Serial No. 476,830 of which this is a division. The mounting is accomplished by means of the pair of links 22 and 23 pivoted respectively to the frame above and below the motor and to the motor casing. The front side of the motor is provided with an extended bracket 24 (Figure 2), carrying a shaft whose ends are engaged by the side members of the link 22. The upper end of the link 22 is laterally extended at 24' and carries a shaft secure at its end in bearing members 25—25 riveted to the channel beams 4—4. The other side of the motor is provided with a pair of brackets 26—26 (Figure 1) between which is journaled the upper end of the link 23 upon a shaft extending between the brackets 26—26. The lower end of the link 23 is pivotally mounted upon a shaft 27 carried by the brackets 28—28 (Figure 1). The links 22 and 23 are preferably the same length and correspondingly mounted.

It will be seen from the foregoing and from the position of the parts as indicated in dotted lines in Figure 1, that a substantially horizontal or right line movement of the saw is provided for, as the lower end of the link 22 swings downwardly while the upper end of the link 23 swings upwardly a corresponding distance, thus maintaining the drive shaft 19 at substantially the same vertical height throughout the lateral swing of the saw. The amount of power required to swing the device is obviously much less than would be the case if the motor and saw were mounted to slide upon guides, and the construction is simpler and less expensive. The movements of the motor and saw are readily controlled by means of the hand lever 29 connected by means of the link 30 to the link 23.

The frame work has secured beneath its forward portion the semi-circular base casting 10, and the pin 11 constitutes the means for pivotally connecting this casting and another casting 31 secured to the frame 1 as indicated in Figure 1. The rear portion of the machine rests movably upon the circular track 13, such track being preferably secured to the foundation 12. The track is of the cross section indicated in Figure 1, and has a rearwardly projecting flange portion 14, with which the clamping member 15 is adapted to engage, such clamping member 15 being secured to the movable frame work above by means of the bolt 16. This arrangement permits of the shifting of the entire machine about the bearing pin 11, and provides for the securing of such frame rigidly in any adjusted position. In order to facilitate the movement of the rear end of the frame upon the track 13, the recesses 17 are provided in the track casting for the reception of the end of a crow bar or similar prying means for working the heavy frame along the track.

It will be seen that as the machine is self-contained and all the operative parts are carried by the movable frame-work, it is immaterial in what position the machine is placed with respect to its circular track 13. This is a very desirable feature where long heavy beams are to be operated upon as it is very much easier in such cases to shift the machine so that it will readily receive the beam, than it is to shift the beam around so that it will properly engage a fixed work support. Furthermore, the space in machine shops is often so restricted that it is impossible to do much shifting with a long beam, and under such conditions the function of shiftability is very valuable in a machine of this character.

Having thus described my invention and illustrated its use what I claim as new and desire to secure by Letters Patent is the following:

1. In combination in a metal cutting machine, a supporting frame, a drive shaft, a saw carried thereby, a bearing for the shaft, a supporting link pivoted to the bearing on one side thereof and to the frame above the drive shaft, and a supporting link of substantially the same length as the first link pivoted to the opposite side of the bearing and the frame below the drive shaft, the links being so arranged as to carry the weight of the bearing, drive shaft, and saw and to maintain the movement of the drive shaft upon substantially a horizontal line as it moves back and forth to bring the saw into engagement with the work.

2. In combination in a metal cutting machine, a supporting frame, a drive shaft, a saw carried thereby, a motor carrying the drive shaft, a supporting link pivoted to the motor on one side thereof and to the frame above the drive shaft, and a supporting link pivoted to the opposite side of the motor and to the frame below the drive shaft, the links being arranged so as to carry the weight of the saw, motor and drive shaft and to maintain the movement of the drive shaft upon substantially a horizontal line as it moves back and forth to bring the saw into engagement with the work.

In testimony whereof I have hereunto signed by name in the presence of the two subscribed witnesses.

E. G. TODT.

Witnesses:
R. L. NASH,
PEARL SMART.